Dec. 15, 1931.  A. L. GOLDSBERRY  1,836,068
SLUSH PUMP VALVE
Filed May 4, 1929
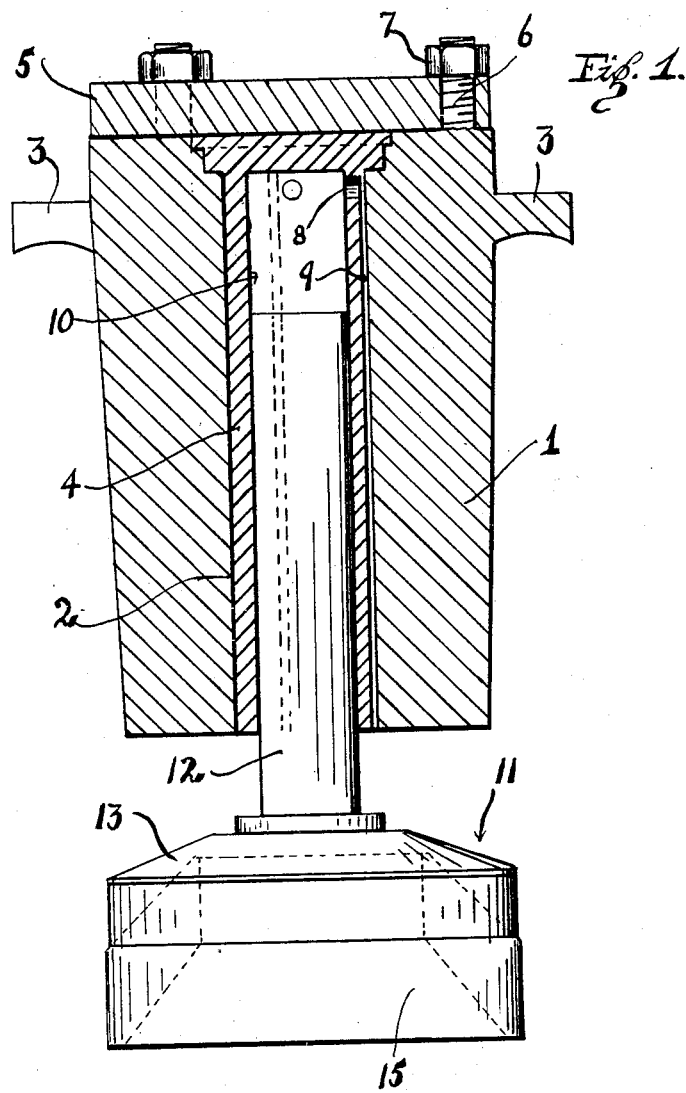
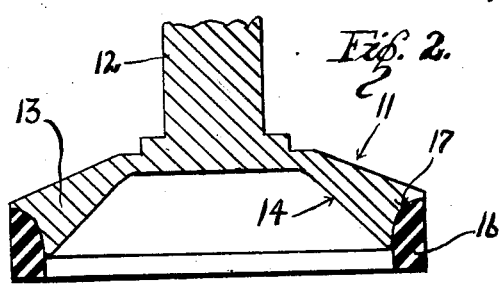
INVENTOR.
ANGUS L. GOLDSBERRY
BY
ATTORNEY.

Patented Dec. 15, 1931

1,836,068

UNITED STATES PATENT OFFICE

ANGUS L. GOLDSBERRY, OF LONG BEACH, CALIFORNIA

SLUSH PUMP VALVE

Application filed May 4, 1929. Serial No. 360,413.

This invention relates to a valve particularly useful in slush pumps, or the like, these pumps being in common use in rotary well drilling rigs.

An object of my invention is to provide a valve which is simple in construction and requires little finishing machine work thereon.

Another object is to provide a novel rubber sealing ring which ring will not wear quickly and which will effectively assist in sealing the valve.

Other objects, advantages, and features of invention may appear from the accompanying drawings, the subjoined, detailed description, and the appended claim.

In the drawings

Figure 1 is a longitudinal sectional view of the pump guide bushing with my valve positioned therein, the valve being shown in elevation.

Figure 2 is a fragmentary transverse sectional view of the valve.

Referring more particularly to the drawings, the numeral 1 indicates the valve bushing, said bushing being formed with a longitudinally extending bore 2 in the center thereof. A plurality of handles 3 are integrally formed on the bushing, the purpose of these handles being to enable the operator to more readily remove the bushing from the pump when it is necessary to release or repair the same.

A sleeve 4 fits within the bore 2 and a head is formed on the sleeve, the purpose of the head being to prevent downward movement of the sleeve. A plate 5 rests on top of the bushing and bears against the sleeve whereby the sleeve is held in position. A plurality of studs 6 rise from the top of the bushing 1 and extend through the heads 5 and nuts 7 screw on the studs against the head, thus holding the sleeve securely in position.

A plurality of openings 8 are formed through the sleeve 4 adjacent the top thereof and these openings communicate with longitudinal slots 9, the purpose of these slots being to permit liquid to drain downwardly out of the central bore 10 of the sleeve. The valve 11 is provided with a stem 12 which is integrally formed with the body 13.

The outside of the stem 12 is machined in order to accurately fit the bore 10 but this machining operation is inexpensive and is quickly accomplished. An inner tapered seat 14 is formed in the body 13 and this seat rests upon the valve ring seat 15, the upper surface of said ring being tapered to conform to the seat 14.

A rubber sealing ring 16 extends around the outer periphery of the body 13 and this ring projects slightly below the lower edge of said body. The body 13 is formed with an annular arcuate-shaped recess 17 in which the ring 16 fits. The purpose of this arcuate recess is that when the valve seats upon the valve ring seat 15, the sealing ring 16 will first strike upon the upper inclined surface of the ring seat, and will then be pushed slightly outwardly and rock in the arcuate groove or recess 17. Thus each time the valve opens and closes the sealing ring 16 will rock back and forth in the groove.

It is understood, however, that the ring 16 does not entirely seal the valve but merely assists and the final seal is in the metal-to-metal seat between the ring seat 15 and the tapered surface 14 of the valve body.

Having described my invention, I claim:

A valve for slush pumps, and the like, comprising a body, a stem rising from the body, said body and stem being integrally formed, an arcuate annular recess in the outer periphery of said body and adjacent the bottom thereof, a rubber ring seated in said recess, said ring depending below the body, and an upwardly inclined seat in the body.

In testimony whereof, I affix my signature.

ANGUS L. GOLDSBERRY.